(12) United States Patent
Nagayama

(10) Patent No.: US 12,439,942 B2
(45) Date of Patent: Oct. 14, 2025

(54) METHOD FOR PRODUCING NOODLE STRANDS WITH WAVY CROSS-SECTION

(71) Applicant: SANYO FOODS CO., LTD., Tokyo (JP)

(72) Inventor: Yoshiaki Nagayama, Tokyo (JP)

(73) Assignee: SANYO FOODS CO., LTD., Tokyo (JP)

( * ) Notice: Subject to any disclaimer, the term of this patent is extended or adjusted under 35 U.S.C. 154(b) by 836 days.

(21) Appl. No.: 17/637,731

(22) PCT Filed: Aug. 17, 2020

(86) PCT No.: PCT/JP2020/031019
§ 371 (c)(1),
(2) Date: Feb. 23, 2022

(87) PCT Pub. No.: WO2021/039473
PCT Pub. Date: Mar. 4, 2021

(65) Prior Publication Data
US 2022/0279823 A1 Sep. 8, 2022

(30) Foreign Application Priority Data
Aug. 27, 2019 (JP) ................................. 2019-154782

(51) Int. Cl.
*A23L 7/10* (2016.01)
*A21C 11/20* (2006.01)
(Continued)

(52) U.S. Cl.
CPC ............... *A23L 7/113* (2016.08); *A21C 11/22* (2013.01); *A21C 11/24* (2013.01); *B26D 3/10* (2013.01); *A23V 2002/00* (2013.01)

(58) Field of Classification Search
CPC ........... A21C 11/22; A21C 11/24; A21C 9/08; B26D 3/10; A23L 7/113
See application file for complete search history.

(56) References Cited

U.S. PATENT DOCUMENTS 3,932,089 A * 1/1976 Ando ................... A21C 11/24
425/363
5,402,715 A * 4/1995 Kurachi ................ A21C 11/06
99/450.2
(Continued)

FOREIGN PATENT DOCUMENTS

CN 203482814 U 3/2014
CN 107691547 A 2/2018
(Continued)

OTHER PUBLICATIONS

International Search Report PCT/JP2020/031019, mailed Oct. 27, 2020.

*Primary Examiner* — Ericson M Lachica
(74) *Attorney, Agent, or Firm* — Merchant & Gould P.C.

(57) ABSTRACT

Provided is a method for producing noodle strands with which it is possible to reduce or prevent adhesion of wide noodle strands to each other. The method for producing noodle strands with a wavy cross-section comprises the preparation of a noodle strip and the cutting of the noodle strip into noodle strands using a cutting blade device. The cutting blade device has a pair of cutting blade rolls. The cutting blade rolls each have multiple circular grooves and multiple blades disposed alternately along the longitudinal direction of the cutting blade rolls, and are disposed so that the circular grooves of one cutting blade roll engage with the blades of the other cutting blade roll. The circular grooves of the cutting blade rolls each have two first groove sections near blades that are adjacent along the longitudinal direction of the cutting blade rolls and a second groove section between the two first groove sections that is deeper than the two first groove section. When the shortest distance between a first groove section of one cutting blade roll and the blade of the other cutting blade roll that faces said first groove (Continued)

section is $D_1$, the thickness of the noodle strip is 2.0-2.7 times $D_1$.

9 Claims, 4 Drawing Sheets

(51) Int. Cl.
    *A21C 11/22*     (2006.01)
    *A21C 11/24*     (2006.01)
    *A23L 7/113*     (2016.01)
    *B26D 3/10*     (2006.01)

(56) References Cited

U.S. PATENT DOCUMENTS

| | | | | |
|---|---|---|---|---|
| 5,443,379 | A * | 8/1995 | Hsu | A21C 11/06 425/336 |
| 2004/0121060 | A1* | 6/2004 | Lee | A21C 11/16 426/557 |
| 2011/0138636 | A1* | 6/2011 | Ishii | A21C 11/24 30/299 |
| 2011/0311698 | A1* | 12/2011 | Morris | A21C 3/02 426/502 |
| 2013/0202765 | A1* | 8/2013 | Nagayama | A21C 11/24 83/503 |
| 2016/0007617 | A1* | 1/2016 | Wang | A23L 7/197 426/555 |
| 2016/0262406 | A1* | 9/2016 | Yatsuda | A23L 7/109 |
| 2016/0374376 | A1* | 12/2016 | Tanaka | A21C 9/02 426/451 |
| 2019/0082723 | A1* | 3/2019 | Yamada | A23L 3/40 |
| 2019/0216099 | A1* | 7/2019 | Li | A21C 11/24 |

FOREIGN PATENT DOCUMENTS

| | | |
|---|---|---|
| JP | S50-94179 A | 7/1975 |
| JP | H10-155442 A | 6/1998 |
| JP | 2011-109959 A | 6/2011 |
| JP | 2016-049072 A | 4/2016 |
| JP | 2019-097559 A | 6/2019 |
| KR | 10-1656311 B1 | 9/2016 |

* cited by examiner

METHOD FOR PRODUCING NOODLE STRANDS WITH WAVY CROSS-SECTION

This application is a National Stage Application of PCT/JP2020/031019 filed Aug. 17, 2020, which claims benefit of priority to Japanese Patent Application No. 2019-154782, filed Aug. 27, 2019, which applications are incorporated herein by reference. To the extent appropriate, a claim of priority is made to each of the above disclosed applications.

FIELD

The present disclosure relates to a method for producing noodle strands having a wavy cross-section.

BACKGROUND

Methods for producing instant noodles generally include a step in which cut noodle strands are steamed prior to drying a noodle block, and a step in which the block-shaped mass of noodle strands (noodle block) contained in a retainer is dried. When the noodle strands adhere to each other during the steaming, containing, or drying steps, workability is impaired. Adhesion between noodle strands may have a significant adverse effect on the quality of the product, such as insufficient gelatinization of the noodle strands during steaming and poor unraveling of the noodle strands when eaten. The width of the noodle strands in instant noodles is generally about 1.0 to 2.5 mm in the case of ramen and about 2.0 to 4.3 mm in the case of udon. Adhesion between noodle strands becomes more pronounced as the width of the noodle strands increases.

Patent Literature 1 (JP 2016-049072 A) describes wide noodles which have a wide surface but do not easily adhere to each other when boiled, and a noodle making apparatus and cutting rollers with which such wide noodle strands can be produced (Description, paragraph 0010).

Patent Literature 2 (JP H10-155442 A) describes wide noodles in which there is no adhesion between noodle strands when the noodle strands are reconstituted in cooking water, which can be uniformly reconstituted, which are smooth and uniformly elastic, and which have surface recesses and projections, as well as a method for the production thereof (Description, paragraph 0006).

CITATION LIST

Patent Literature

[PTL 1] JP 2016-049072 A
[PTL 2] JP H10-155442 A

SUMMARY

Technical Problem

As raw noodles or dried noodles (noodles that have been dried at low temperature for a long period of time without steaming raw noodles), noodles which are wider than udon, etc., such as fettuccine (noodle strand width is approximately 5.0 to 7.5 mm), are known. In methods for producing dried noodles, in general, the noodle strands cut or extruded into a linear shape are dried as-is, and thus, adhesion between noodle strands is not a significant problem. However, in order to produce such wide noodles as instant noodles, it is necessary to further reduce the adhesion between noodle strands.

The present disclosure provides a method for producing noodle strands which have a texture similar to that of conventional wide noodle strands and with which adhesion between the wide noodle strands can be reduced or prevented.

Solution to Problem

The present inventors have discovered that by using a cutting apparatus comprising a pair of cutting rollers having specifically-shaped annual grooves and blades and setting the relationship between the distance between the annular grooves and the blades facing the same and the thickness of a noodle belt to a predetermined range, noodle strands having a wavy cross-section can be cut, and the noodle strands having such a wavy cross-section can effectively reduce or prevent adhesion between noodle strands, and have completed the present invention.

The present invention encompasses the following embodiments [1] to [11].

[1]
A method for producing noodle strands having a wavy cross-section, the method comprising:
preparing a noodle belt, and
cutting the noodle belt into noodle strands with a cutting apparatus, wherein
the cutting apparatus has a pair of cutting rollers, and each of the cutting rollers has a plurality of annular grooves and a plurality of blades which are alternatingly arranged along the longitudinal direction of the cutting rollers,
the cutting rollers are arranged so that the annular grooves of one of the cutting rollers engage with the blades of the other cutting roller,
each of the annular grooves of the cutting rollers has two first grooves located near the blades adjacent thereto along the longitudinal direction of the cutting roller, and a second groove which is deeper than the two first grooves between the two first grooves, and
when the shortest distance between the first grooves of one of the cutting rollers and the blades of the other cutting roller, which face the first grooves, is defined as $D_1$, the thickness of the noodle belt is 2.0 to 2.7 times $D_1$.

[2]
The method according to [1], wherein the thickness of the noodle belt is 2.0 to 2.5 times $D_1$.

[3]
The method according to [1] or [2], wherein the thickness of the noodle belt is 0.6 mm to 4.0 mm.

[4]
The method according to any one of [1] to [3], wherein the width of the annular grooves is 2.0 mm to 30 mm.

[5]
The method according to any one of [1] to [4], wherein the width of the first grooves is 0.5 mm to 11.3 mm.

[6]
The method according to any one of [1] to [5], wherein the width of the second grooves is 0.5 mm to 15 mm.

[7]
The method according to any one of [1] to [6], wherein the ratio of the width of the first grooves to the width of the second grooves is 0.5:1 to 1.5:1.

[8]
The method according to any one of [1] to [7], wherein when the shortest distance between the second grooves of one of the cutting rollers and the blades of the other cutting roller, which face the second grooves, is defined as $D_2$, $D_2$ is 3.0 mm or more.

[9]

The method according to any one of [1] to [8], wherein the cross-sectional area of the noodle strands passing through unit spaces each formed by the annular groove of one of the cutting rollers and the blade of the other cutting roller is 90% or less of the cross-sectional area of the unit space.

[10]

The method according to any one of [1] to [9], wherein the noodle strands are used for noodles selected from the group consisting of Chinese noodles, pasta, udon, and soba.

The method according to any one of [1] to [10], further comprising:

steaming and gelatinizing the cut noodle strands, and drying the gelatinized noodle strands.

Advantageous Effects of Invention

According to the present invention, adhesion between wide noodle strands can be reduced or prevented. According to the present invention, wide noodle strands and instant noodles, such as udon and pasta, can be produced with high quality and high efficiency.

The above descriptions shall not be deemed to disclose all embodiments of the invention and all advantages relating to the invention.

DESCRIPTION OF EMBODIMENTS

Figure 1:
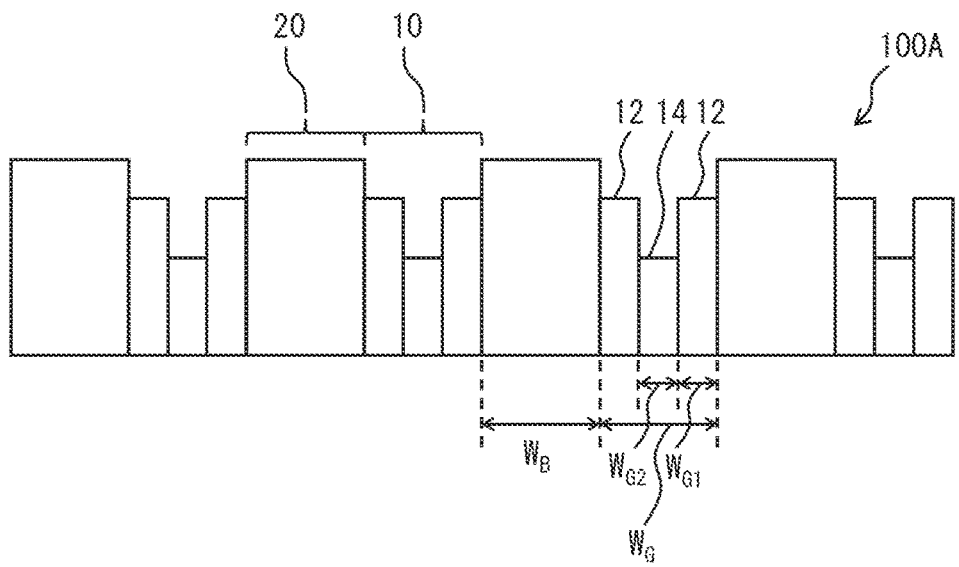
FIG. 1 is a partial schematic cross-sectional view along the longitudinal direction of a cutting roller according to an embodiment.

The present invention will be described in more detail below with reference to the drawings in order to illustrate typical embodiments of the present invention, but the present invention is not limited to these embodiments. Regarding the reference signs of the drawings, elements assigned similar signs in different drawings indicate similar or corresponding elements.

As used herein, "noodles" means a food which comprises wheat flour, starch, rice flour, buckwheat flour, bean flour, etc., as the main ingredient, which is processed into a linear shape, and which can be eaten when cooked by boiling, simmering, stir-frying, hot water immersion, or heating in a microwave oven with or without water immersion. Examples of noodles include udon, kishimen noodles, Chinese noodles, soba, pasta, etc. Examples of the state of noodles before cooking include raw noodles, dried noodles, steamed noodles, boiled noodles, frozen noodles, and instant noodles.

As used herein, "instant noodles" means, among noodles, a food which can be stored for a long period of time by heating and drying raw noodles, steamed noodles, or boiled noodles, and removing the moisture contained in the noodles to approximately 2 to 10% by mass in the case of fry-drying, and to approximately 6 to 14.5% by mass in the case of hot-air drying. "Dried noodles" are noodles which do not include a gelatinization step in the production process and which are dried at room temperature or low temperature for a long period of time. In the present disclosure, dried noodles are distinguished from instant noodles and excluded from instant noodles.

As used herein, "noodle strands" means noodles which are mechanically cut from a noodle belt by using a cutting apparatus. The cross-sectional shape of noodle strands produced by the present invention is a shape having a wavy contour formed by combining a circle, an oval, a square, a rectangular or a part thereof or combining the same such shapes having different thicknesses, and the corners thereof may be chamfered.

As used herein, "noodle strand bundle" means a group of a plurality of noodle strands cut from a single cutting roller having a plurality of annual grooves. When a cutting apparatus comprising a pair of cutting rollers is used, noodle strand bundles are output from the respective cutting rollers. These two noodle strand bundles are usually stacked and processed in subsequent processes.

As used herein, "texture similar to that of conventional noodles strands" means the hardness of the noodle strands perceived when eaten after cooking is "uniform" or "substantially uniform" in the width direction of the noodle strands. The term "uniform" means that the hardness is substantially identical across the width of the noodle strands. The term "substantially uniform" means that the hardness is slightly uneven and different in the width direction of the noodle strands, but the reconstitution of the entirety of the noodle strands is sufficient for eating.

Noodle belts can be prepared by conventional methods. For example, a dough is formed by kneading a main ingredient and auxiliary ingredients, such as water, salt, and brine. A kneader, planetary mixer, etc., can be used in the kneading of the main ingredient and the auxiliary ingredients. The shape of the dough is generally irregular, but it may be formed into a cylindrical shape, a square tubular shape, etc., using an extruder or the like after kneading. Examples of the main ingredient include wheat flour, starch, rice flour, buckwheat flour, and bean flour.

Thereafter, the dough is processed into a sheet-like shape having a thickness suitable for being cut into noodle strands. As a processing method, two or three coarse noodle belts, which are intermediates formed by rolling, are stacked by using a compound machine and then further rolled between subsequent rollers. Another processing method is to extrude the dough directly into a sheet by using an extruder.

Next, the noodle belt is cut into noodle strands by using a cutting apparatus.

The cutting apparatus has a pair of cutting rollers. Stainless steel, iron, etc., can be used as the material of the cutting rollers. Each of the cutting rollers has a plurality of annular grooves and a plurality of blades which are alternatingly arranged along the longitudinal direction of the cutting rollers, and the cutting rollers are arranged so that the annular grooves of one of the cutting rollers engage with the blades of the other cutting roller. Each of the annular grooves of the cutting rollers has two first grooves near the blades adjacent thereto along the longitudinal direction of the cutting rollers, and a second groove which is deeper than the two first grooves and which is arranged between the two first grooves.

FIG. 1 shows a partial schematic cross-sectional view along the longitudinal direction of the cutting rollers of an embodiment. A plurality of annular grooves 10 and a plurality of blades 20 are alternatingly arranged in a cutting roller 100A along the longitudinal direction thereof. Each of the annular grooves 10 has two first grooves 12 near the blades 20 adjacent thereto along the longitudinal direction of the cutting roller 100A, and a second groove 14 which is deeper than the two first grooves 12 therebetween. In FIG. 1, $W_B$ is the width of the blades 20, $W_G$ is the width of the annular grooves 10, $W_{G1}$ is the width of the first grooves 12, and $W_{G2}$ is the width of the second groove 14.

The width $W_B$ of the blades 20 and the width $W_G$ of the annular grooves 10 are generally equal, or the width $W_G$ of the annular grooves 10 may be slightly greater than the width $W_B$ of the blades 20 and may be, for example, 10 μm to 100 μm greater than the width $W_B$ of the blades 20.

In an embodiment, the width $W_G$ of the annular grooves is 2.0 mm to 30 mm, preferably 2.3 mm to 15 mm, and more preferably 3.2 mm to 10 mm. The present invention is more effective for wide noodle strands cut out by such relatively large-width annular grooves. In the present disclosure, noodles formed by the cutting rollers having annual grooves having a width of 2.0 mm or more are referred to as wide noodles, and examples of wide noodles include udon, certain pastas, such as fettucine, specific local noodles, such as Sano ramen, Kitakata ramen, and Okinawa soba, as well as kishimen noodles, flat noodles, etc.

In an embodiment, the width $W_{G1}$ of the first grooves is 0.5 mm to 11.3 mm, preferably 0.6 mm to 5.6 mm, and more preferably 0.8 mm to 3.8 mm.

In an embodiment, the width $W_{G2}$ of the second grooves is 0.5 mm to 15 mm, preferably 0.6 mm to 7.5 mm, and more preferably 0.8 mm to 5.0 mm.

In an embodiment, the ratio of the width $W_{G1}$ of the first grooves to the width $W_{G2}$ of the second grooves is 0.5:1 to 1.5:1, preferably 0.7:1 to 1.3:1, and more preferably 0.9:1 to 1.1:1. By setting the ratio of the width $W_{G1}$ of the first grooves to the width $W_{G2}$ of the second grooves to 0.5:1 or greater, the noodle material can effectively be pushed into the second grooves. By setting the ratio of the width $W_{G1}$ of the first grooves to the width $W_{G2}$ of the second grooves to 1.5:1 or less, it is possible to prevent the cross-sectional shape of noodle strands from becoming T-shaped (convex). Noodle strands having a T-shaped (convex) cross-section are used when there is a desire for a texture having different hardnesses in the noodle strands when reconstituted, i.e., a texture in which convex parts, which are thick and difficult to be reconstituted, are hard and other parts are soft. However, such noodle strands are not preferable in the present disclosure, since they have a texture different from that of conventional noodle strands.

When a noodle belt passes through a cutting apparatus, in order to effectively push the noodle material into the second grooves in cooperation with the blades, it is desirable that the cross-section of the first grooves have a flat portion. In an embodiment, the cross-section of the first grooves is flat in a region of 5% or more, preferably 10% or more, and more preferably 20% or more of the width $W_{G1}$ of the first grooves.

The cross-sectional shape of the second grooves is not particularly limited. The cross-section of the second grooves may be semicircular, semi-elliptical, square, rectangular, triangular, or a combination of a part of these shapes, and the corners thereof may be chamfered.

Figure 2:
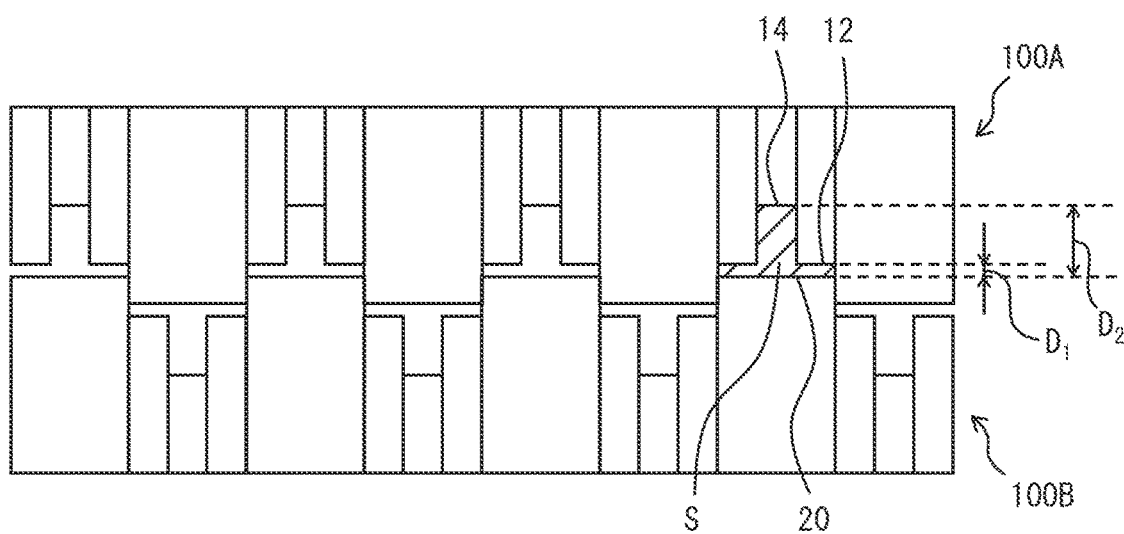
FIG. 2 is a partial schematic cross-sectional view along the longitudinal direction of a pair of cutting rollers according to an embodiment.

FIG. 2 shows a partial schematic cross-sectional view along the longitudinal direction of a pair of cutting rollers of an embodiment. Cutting rollers 100A and 100B are arranged so that the annular grooves of the cutting roller 100A engage with the blades of the cutting roller 100B and the annular grooves of the cutting roller 100B engage with the blades of the cutting roller 100A.

In FIG. 2, $D_1$ is the shortest distance between the first grooves 12 of the cutting roller 100A and the blades 20 of the cutting roller 100B, and $D_2$ is the shortest distance between the second grooves 14 of the cutting roller 100A and the blades 20 of the cutting roller 100B. $D_1$ and $D_2$ are also the shortest distances between the first grooves 12 and the second grooves 14 of the cutting roller 100B and the blades 20 of the cutting roller 100A, respectively.

In an embodiment, $D_1$ is 0.3 mm to 1.5 mm, preferably 0.4 mm to 1.0 mm, and more preferably 0.5 mm to 0.8 mm.

$D_2$ varies depending on the ratio of the thickness T of the noodle belt to $D_1$ of the first grooves and the width $W_{G2}$ of the second grooves. In general, $D_2$ is determined so that the cross-sectional area of a unit space formed by the annular groove and the blade in each groove of the cutting roller is larger than the cross-sectional area of the noodle belt supplied to each groove of the cutting roller. Since the noodle belt is distorted by the stress generated by compression when the noodle material is extruded, even when the cross-sectional area of the noodle belt supplied to each groove of the cutting roller and the cross-sectional area of the unit space of each groove of the cutting roller are the same, the noodle belt may not completely fill the unit space. For example, when the thickness T of the noodle belt is N times $D_1$ and the area of the chamfered portions of the first grooves 12 adjacent to the second groove 14 is $S_C$, $D_2 \geq D_1 + [(N-1) \times D_1 \times W_G - S_C]/W_{G2}$. When there is no chamfered portion, i.e., when $S_C=0$, the above equation can be rewritten as $D_2 \geq D_1 + [(N-1) \times D_1 \times W_G]/W_{G2}$.

When the noodle material comes into contact with the bottom (flat portion) of the second groove, there is a risk that the surface of the noodle strand may become roughened or it may be difficult to remove the noodle strand from the annular groove. Thus, it is preferable that $D_2$ have a dimension (depth) having a sufficient margin so that the noodle material does not come into contact with the bottom (flat portion) of the second groove. For example, $D_2$ is 3.0 mm or more, 4.0 mm or more, 5.0 mm or more, or 8.0 mm or more. Even when $D_2$ is increased (deepened), the effect of extruding the noodle material into the second groove 14 is not eliminated. However, in consideration of general cutting roller diameter, for example, $D_2$ is 10 mm or less, 15 mm or less, or 20 mm or less.

Figure 3:
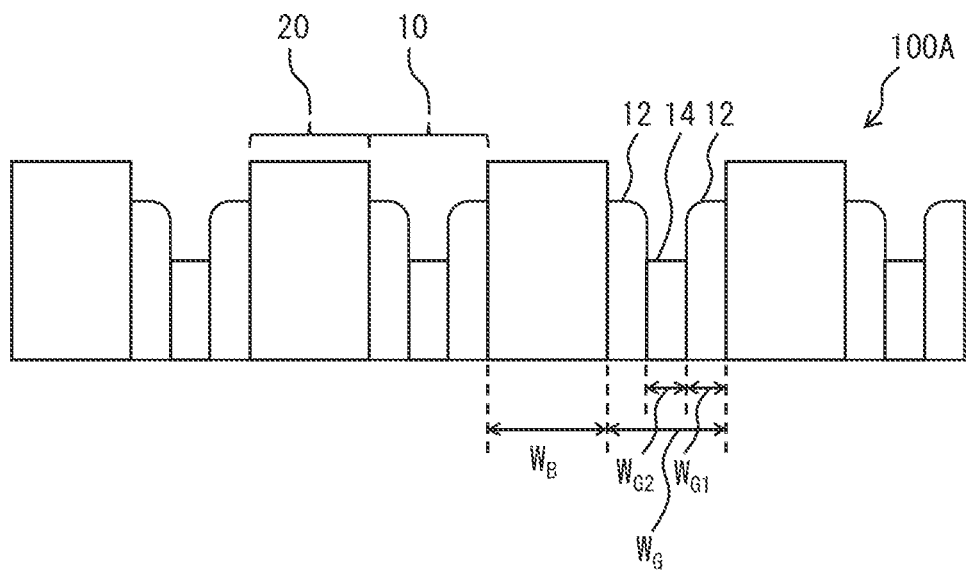
FIG. 3 is a partial schematic cross-sectional view along the longitudinal direction of a cutting roller according to another embodiment.
Figure 4:
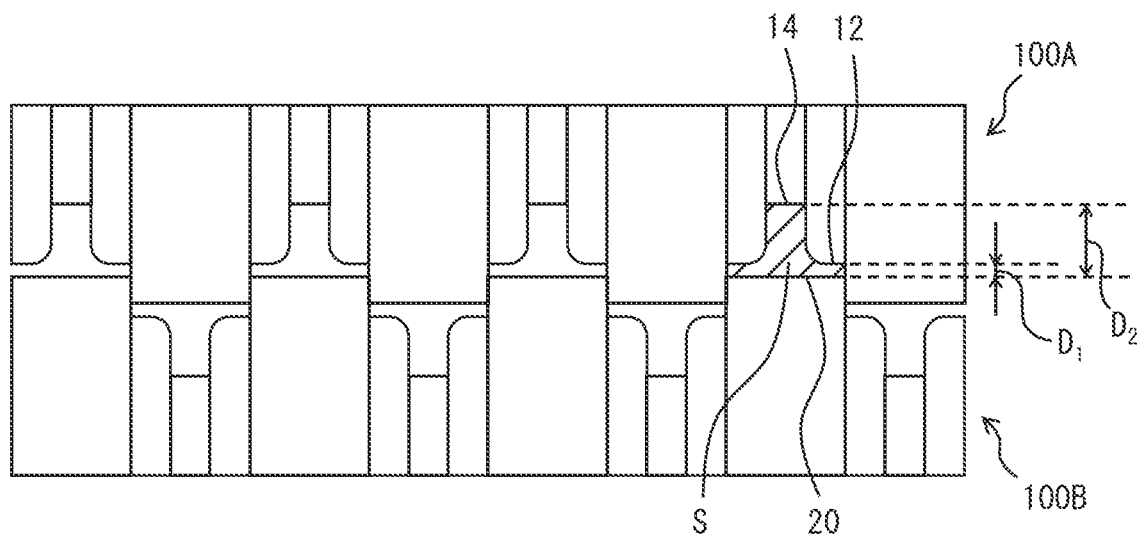
FIG. 4 is a partial schematic cross-sectional view along the longitudinal direction of a pair of cutting rollers according to another embodiment.

The portions of the first grooves 12 adjacent to the second groove 14 may be chamfered. As a result, when cutting the noodle belt, the noodle material can be pushed more smoothly from the first grooves 12 into the second groove 14. Further, it is possible to more effectively prevent the cross-sectional shape of the noodle strands to be cut out from being T-shaped (convex). FIGS. 3 and 4 respectively show partial schematic cross-sectional views of the cutting roller 100A and a pair of cutting rollers 100A, 100B of another embodiment, in which the portions of the first grooves 12 adjacent to the second groove 14 are chamfered.

Figure 5:
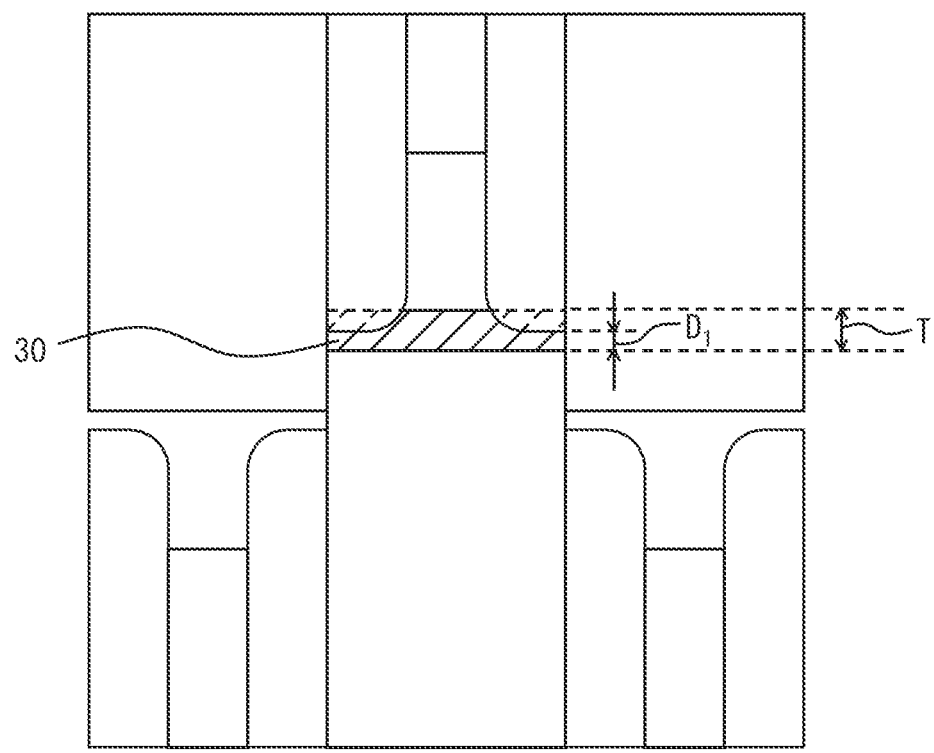
FIG. 5 is a schematic cross-sectional view showing the dimensional relationship between annular grooves and blades of cutting rollers and a noodle belt.
Figure 6:
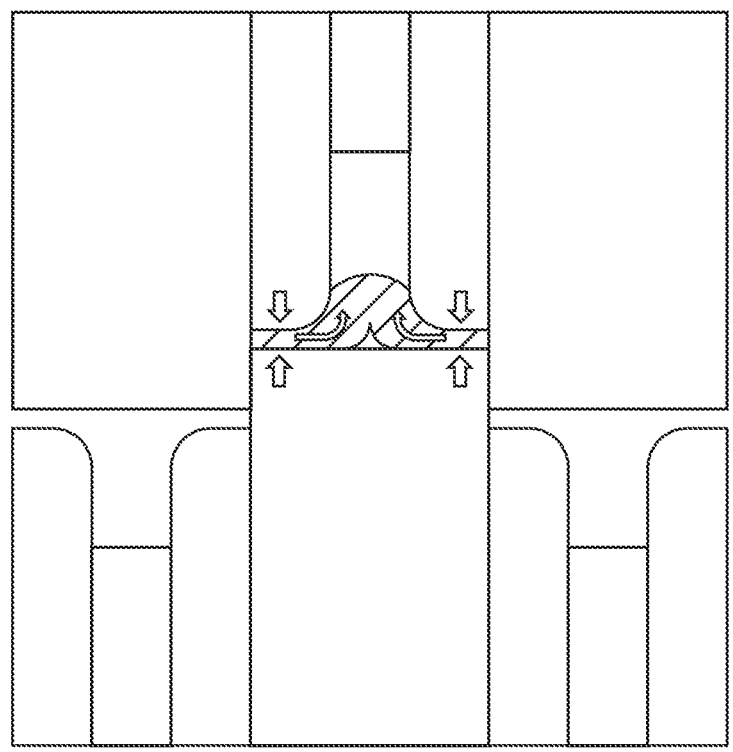
FIG. 6 is a schematic cross-sectional view showing how force is applied when a noodle belt is cut into noodle strands.
Figure 7:
FIG. 7 is a schematic cross-sectional view of a noodle strand having a wavy cross-section.

The thickness of the noodle belt passing through the cutting apparatus is 2.0 to 2.7 times $D_1$. FIG. 5 shows a schematic cross-sectional view of the dimensional relationship between the annular grooves and the blades of the cutting rollers and the noodle belt. The thickness T of the noodle belt 30 is greater than $D_1$, and is 2.0 to 2.7 times $D_1$. In the case that the noodle belt, which is thicker than the space between the first grooves and the blade, passes through the cutting apparatus, as shown in FIG. 6, when the noodle belt is cut into noodle strands, the noodle belt is compressed by the opposing first grooves and blade, and a part of the noodle material is pushed out from the first grooves and moved into the second groove. As a result, the noodle strands are cut while deformed, whereby noodle strands 40 having a wavy cross-section as shown in FIG. 7 can be produced. In noodle strands having a wavy cross-section, the contact area between the noodle strands can be reduced and adhesion between the noodle strands can effectively be suppressed or prevented. Furthermore, by setting the thickness of the noodle belt to 2.0 to 2.7 times $D_1$, noodle strands which are aesthetically pleasing and which do not have an unusual texture when eaten can be provided without excessive deformation of the cross-section of the noodle strands. The noodle strands 40 may have internal stresses generated during compression and cutting by the first grooves and the blades. In FIG. 7, the left and right ends of the noodle strand 40 are shown to be deformed along the upper side, and this deformation is caused by the internal stress generated in the noodle strand due to the shearing force during compression and cutting by the first grooves and the blade.

The thickness T of the noodle belt is preferably 2.0 to 2.5 times $D_1$. As a result, noodle strands having a more uniform texture can be formed.

In an embodiment, the thickness T of the noodle belt is 0.6 mm to 4.0 mm, preferably 0.8 mm to 2.5 mm, and more preferably 1.0 mm to 2.0 mm.

It is desirable that the thickness T of the noodle belt be determined so that the noodle belt does not completely fill the unit spaces each formed by the annual groove and the blade. FIGS. 2 and 4 show cross-sections S of the unit spaces formed by the annular grooves and the blades. In an embodiment, the cross-sectional area of the noodle belt passing through the unit space described above is 90% or less, preferably 85% or less, and more preferably 80% or less, of the area of the cross-section S of the unit space described above.

Each of the cutting rollers is connected to a drive device, such as a motor, via a gear, and by passing the noodle belt between the cutting rollers while rotating the pair of cutting rollers in opposite directions to each other, the noodle belt is cut into noodle strands by the blades of one cutting roller and the annular grooves of the other cutting roller.

The noodle strands formed by cutting the noodle belt enter the annual grooves of the cutting rollers. The noodle strands in the annular grooves can be scraped from the cutting rollers using a scraper.

In an embodiment, the pair of cutting rollers are arranged aligned in the horizontal direction, and the noodle strands scraped with the scraper move (fall) in the vertical direction. In another embodiment, the pair of cutting rollers are arranged side by side at an angle of greater than 0 degrees and 90 degrees or less from the horizontal direction, and the noodle strands scraped by the scraper fall while moving diagonally downward.

Any known scraper which can be used in the cutting apparatus can be used as the scraper. The scraper has a plate-shaped part extending along the longitudinal direction of the cutting rollers, and a plurality of protrusions extending on the long side of the plate-shaped part in a direction substantially orthogonal to the long side. Each of the plurality of protrusions engages with a corresponding one of the plurality of annular grooves of the cutting rollers, and the plurality of protrusions scrape noodle strands in the plurality of annular grooves from the cutting roller. The noodle strands scraped from one of the cutting rollers form a noodle strand bundle composed of a group of a plurality of noodle strands aligned along the longitudinal direction of that cutting roller, and move in the vertical direction or along the downward inclined direction.

Thus, two noodle strand bundles are formed from the pair of cutting rollers. The scraper can also be referred to as a kasuri. In rare cases, the remnants of noodle strands may remain on the cutting rollers. In order to remove the noodle strand remnants from the cutting rollers, the scraper may be provided with a plurality of protrusions in contact with the blades.

The plate-shaped part of the scraper functions as a support member for holding the plurality of protrusions at predetermined positions, and can also absorb the stresses applied to the plurality of protrusions. The scraper can be affixed to a housing with bolts or the like using the plate-shaped portion of the scraper.

The plurality of protrusions of the scraper may extend linearly and may include bent parts or curved parts. The corners of the plurality of protrusions may be chamfered.

The scraper can be obtained by forming comb-shaped notches on one side of one plate to form the plurality of protrusions. The plate may be bent so as to have one or more obtuse angles, and the portion corresponding to the plurality of protrusions, the portion corresponding to the boundary between the plurality of protrusions and the plate-shaped portion, or both may be bent or curved. As the scraper material, brass, phosphor bronze, stainless steel or the like can be used. Brass and phosphor bronze are easy to be processed, and stainless steel has excellent durability.

The cutting apparatus may further be provided with a guide which receives the cut noodle strands as needed. The guide may also be referred to as a conduit, guide tube, or "wavebox". The cutting rollers, scraper, and optional guide may be attached to a frame-shaped housing formed of stainless steel, iron, or the like.

Any known guide which can be used in the cutting apparatus and which has a function of receiving noodle strands scraped from the cutting roller by the scraper and thereafter directing the noodle strands onto a conveyor can be used as the guide. The guide may further be provided with a divider which divides the noodle strand bundle and is arranged along the longitudinal direction of the cutting roller. The guide is generally arranged, directly below or diagonally below the pair of cutting rollers and between the pair of cutting rollers and the conveyor, vertically so that the noodle strands move vertically, or inclined so that the noodle strands move diagonally downward.

The guide is generally gutter-shaped, plate-shaped, or tubular and can be formed using a material, such as stainless steel or plastic. The upper side of the guide may be open, or a lid which can be opened and closed and which can adjust the height of the opening may be disposed on the upper side of the guide. The lid may be attached to the guide, integrally formed with the guide, or attached to a portion separate from the guide, such as a housing equipped with the cutting rollers. The guide and the lid may be made of the same material or may be made of different materials. For example, when the guide is made of stainless steel, the lid may be a sheet made of soft plastic or silicone rubber.

A conveyor can be arranged directly below the cutting rollers or below the outlet of the guide. The conveyor is not particularly limited, and may be a wire mesh conveyor, net conveyor, belt conveyor, or the like. The cut noodle strands are transferred onto the conveyor either directly or via the guide. The two noodle strand bundles formed by the pair of cutting rollers are stacked vertically on the conveyor or guide and transferred to subsequent processes for processing.

The transfer speed of the conveyor arranged directly below the cutting apparatus is generally less than the rotational speed of the cutting rollers, i.e., less than the cutting speed of the noodle strands. The noodle strands scraped from the cutting rollers by the scraper, when transferred onto the conveyor, or while moving on the guide, are crimped due to resistance caused by the difference between the transfer speed of the conveyor and the cutting speed of the noodle strands. The state of such crimped noodle strands may be expressed as "wavy" from the shape thereof. When guiding the noodle strands onto the conveyor via a guide having an upper lid, since the noodle strands are crimped in the more constrained space defined by the guide and the lid, the degree of crimps of the noodle strands, i.e., the magnitude of the "waviness" can be made more uniform. When a guide with an upper lid is not used, it is desirable to arrange the conveyor directly under the cutting rollers in order to form crimps in the noodle strands. When the cutting rollers and the conveyor are spaced apart, the noodle strands may not be crimped. Since the distance between the cutting rollers and the conveyor for forming crimps in the noodle strands depends on the raw materials of the noodle strands, production conditions, etc., the conveyor should be "directly below" the cutting rollers to the extent that the noodle strands are crimped. The arrangement of the conveyor and the distance between the cutting rollers and the conveyor are not limited when forming crimps in the noodle strands using a guide having an upper lid.

When steaming the noodle strands, a conveyor which transfers the noodle strand bundle at a slightly higher speed than the conveyor described above may be arranged immediately after the conveyor or in a subsequent process. When steaming, if the density of crimps is too high, the noodle strands may adhere to each other due to gelatinization of the surfaces of the noodle strands. However, even if the noodle strand bundle, in which the density of crimping is sparse enough to prevent the adhesion between noodle strands, is attempted to be made only by the cutting speed of the cutting rollers and the transfer speed of the conveyor, it may be difficult to create crimps of a suitable shape. Thus, on the conveyor immediately after the cutting apparatus, a noodle strand bundle having dense crimping is produced, and thereafter, it can be transferred to a conveyor which transfers the noodle strand bundle at a higher speed before steaming, whereby the density of crimps can be reduced to the extent that the noodle strands do not adhere to each other during steaming. By the increased conveyor speed, the production efficiency of subsequent processes can also be improved. Since the noodle strands obtained by the present invention have a wavy cross-section, it is possible to further reduce the adhesion between noodle strands which occurs when the conveyor passes through the steamer.

A noodle production apparatus of an embodiment comprises the cutting apparatus described above. The noodle production apparatus may comprise a main ingredient and auxiliary ingredient supply device, such as a hopper; a mixing device for kneading the main ingredient and auxiliary ingredients, such as a kneader and a planetary mixer; an extruder; rolling rollers and a compound machine for forming a noodle belt from a dough; a conveyor which transfers noodle strand bundles; a steamer which gelatinizes a starch contained in the noodle strands; a cutting machine which cuts the noodle strand bundles to the length of one serving; a fry-dryer or hot-air dryer; a packaging machine, etc.

In an embodiment, the noodle strands are used in noodles selected from the group consisting of Chinese noodles, pasta, udon, and soba.

In an embodiment, the method for producing the noodle strands may further comprise steaming and gelatinizing the cut noodle strands, and drying the gelatinized noodle strands. Steaming may be carried out by boiling the noodle strands in hot water, or by exposing the noodle strands to high temperature steam at, for example, 99° C. to 100° C. for 1 to 2 minutes. Drying can be carried out by various methods using frying, hot air, microwave irradiation, freeze-drying, cold-drying, etc.

In one embodiment, the noodle strands are used in instant noodles. Instant noodles may be fried noodles or hot air-dried noodles.

EXAMPLES

Specific embodiments of the present disclosure are illustrated in in the following Examples, but the present invention is not limited thereto. All parts and percentages are in terms of mass unless otherwise stated.

(1) Experiment 1 (Examples 1 to 3 and Comparative Examples 1 to 5)

Differences in the characteristics of noodle strands obtained when the shortest distance $D_1$ between the shallower grooves of the annular grooves of the cutting roller, i.e., the first grooves, and the blades which face the same was set to 0.6 mm, and the thickness of a noodle belt was set to 0.9 mm to 1.9 mm were evaluated. The depth $D_2$ of the second grooves of the annular grooves was 4.4 mm.

Noodle raw materials of 10 kg of wheat flour (ASW), 100 g of salt, 10 g of sodium carbonate, and 3300 mL of water (water content 33%) were kneaded to obtain a dough. The obtained dough was compounded and rolled to obtain noodle belts having the thicknesses shown in Table 1. These noodle belts of differing thicknesses were cut into noodle strands by cutting rollers. The width $W_G$ of the annual grooves of the cutting rollers was 6 mm, i.e., gauge No. 5, the shortest distance $D_1$ between the first grooves and the blades was 0.6 mm, the width $W_{G1}$ of each of the first grooves was 2 mm, the width $W_{G2}$ of the second grooves was 2 mm, and the portions of the first grooves adjacent to the second grooves were chamfered with a radius of 1.5 mm (a round chamfer tracing an arc having a radius of 1.5 mm).

The evaluation items are as described below.

Noodle Belt Thickness

The thicknesses of the noodle belts prior to passing through the cutting rollers were measured.

Noodle Strand Thickness

The thickest central part was measured as the thickness of noodle strands after cutting by using the cutting rollers.

Shape

The cross-sectional shapes of the obtained noodle strands after cutting by using the cutting rollers were visually observed. A substantially flat shape was evaluated as A, a wavy shape was evaluated as B, and a shape having a central portion having a T-shaped (convex) cross-section was evaluated as C.

Unraveling

After steaming the noodle strands for 2 minutes, the presence or absence of adhesion between noodle strands was evaluated.

Texture

The steamed noodle strands were dried at 98° C. for 40 minutes to obtain instant noodles (mass: 80 g after drying). The obtained instant noodles were reconstituted in hot water for 5 minutes, and the texture (hardness in the width direction) when the noodles were eaten was evaluated. Noodles in which the hardness of the noodle strands was substantially the same over the width direction of the noodle strands were evaluated as "uniform", noodles in which the hardness was slightly different in the width direction of the noodle strands, but the reconstitution of the entire noodle strands was sufficient for eating were evaluated as "substantially uniform", and noodles in which parts having differing hardness could clearly be perceived were evaluated as "non-uniform." Noodle strands having non-uniform texture had a mixture of portions which were sufficiently reconstituted and had moderate softness for eating, and portions which were not sufficiently reconstituted and had unsuitable hardness for eating.

The evaluation results are shown in Table 1.

From Experiment 2, it can be understood that the effect of the present invention is not simply due to the thickness T of the noodle belt, but rather, is due to the ratio $T/D_1$ between the shortest distance $D_1$ between the first grooves and the blades and the thickness T of the noodle belt.

From Experiment 1 and Experiment 2, it could be understood that the effect of the present invention is achieved when the thickness T of the noodle belt is 2.0 to 2.7 times the shortest distance $D_1$ between the first grooves and the blades, and the noodle belt is passed through a pair of cutting rollers having the specific shape of the present disclosure.

It will be apparent to a person skilled in the art that the embodiments and Examples described above can be modified in various ways without departing from the basic principles of the present invention. It will also be apparent to a person skilled in the art that various improvements and modifications of the present invention can be carried out without departing from the spirit and scope of the present invention.

DESCRIPTION OF REFERENCE SIGNS 100A, 100B cutting roller
10 annular groove
12 first groove
14 second groove
20 blade

TABLE 1

|  | Comp Ex 1 | Comp Ex 2 | Ex 1 | Ex 2 | Ex 3 | Comp Ex 3 | Comp Ex 4 | Comp Ex 5 |
| --- | --- | --- | --- | --- | --- | --- | --- | --- |
| Noodle belt thickness T (mm) | 0.9 | 1.1 | 1.25 | 1.4 | 1.55 | 1.7 | 1.75 | 1.9 |
| Noodle strands thickness (mm) | 0.9 | 1.1 | 1.3 | 1.45 | 1.7 | 1.75 | 1.9 | 2.1 |
| Distance $D_1$ between first grooves and blades (mm) | 0.6 | 0.6 | 0.6 | 0.6 | 0.6 | 0.6 | 0.6 | 0.6 |
| $T/D_1$ | 1.50 | 1.83 | 2.08 | 2.33 | 2.58 | 2.83 | 2.92 | 3.17 |
| Shape | A | A | B | B | B | C | C | C |
| Unraveling | Adhered | Some Adhesion | N/A | N/A | N/A | N/A | N/A | N/A |
| Texture | Uniform | Uniform | Uniform | Uniform | Substantially Uniform | Non-Uniform | Non-Uniform | Non-Uniform |

(2) Experiment 2 (Example 4)

This experiment was carried out under the same conditions as Comparative Example 2 of Experiment 1, except that the shortest distance $D_1$ between the first grooves and the blades was 0.5 mm.

TABLE 2

|  | Comp Ex 2 | Ex 4 |
| --- | --- | --- |
| Noodle belt thickness T (mm) | 1.1 | 1.1 |
| Noodle strands thickness (mm) | 1.1 | 1.2 |
| Distance $D_1$ between first grooves and blades (mm) | 0.6 | 0.5 |
| $T/D_1$ | 1.83 | 2.20 |
| Shape | A | B |
| Unraveling | Some Adhesion | N/A |
| Texture | Uniform | Uniform |

30 noodle belt
40 noodle strands
$W_B$ blade width
$W_G$ annular groove width
$W_{G1}$ first groove width
$W_{G2}$ second groove width
$D_1$ shortest distance between first groove and blade
$D_2$ shortest distance between second groove and blade
S cross-section of unit space
T noodle belt thickness

The invention claimed is:

1. A method for producing instant noodles comprising noodle strands having a wavy cross-section, the method comprising:
preparing a noodle belt,
cutting the noodle belt into cut noodle strands with a cutting apparatus,
steaming and gelatinizing the cut noodle strands, and
drying the gelatinized noodle strands, wherein:

the cutting apparatus has a pair of cutting rollers, and each of the pair of cutting rollers has a plurality of annular grooves and a plurality of blades which are alternatingly arranged along a longitudinal direction of the pair of cutting rollers, the pair of cutting rollers are arranged so that the plurality of annular grooves of one of the pair of cutting rollers engage with the plurality of blades of the other cutting roller, each of the plurality of annular grooves of the pair of cutting rollers has two first grooves and a second groove, wherein each of the two first grooves is located closer to an adjacent blade of the plurality of blades along the longitudinal direction of the pair of cutting rollers as compared to the second groove, and the second groove is deeper than the two first grooves and located between the two first grooves, when a shortest distance along a direction perpendicular to the longitudinal direction of the pair of cutting rollers between the two first grooves of one of the pair of cutting rollers and the plurality of blades of the other cutting roller, which face the two first grooves, is defined as $D_1$, a thickness of the noodle belt is 2.0 to 2.7 times $D_1$, and the ratio of a width of the two first grooves to a width of the second groove is 0.5:1 to 1.5:1.

2. The method according to claim 1, wherein the thickness of the noodle belt is 2.0 to 2.5 times $D_1$.

3. The method according to claim 1, wherein the thickness of the noodle belt is 0.6 mm to 4.0 mm.

4. The method according to claim 1, wherein a width of the plurality of annular grooves is 2.0 mm to 30 mm.

5. The method according to claim 1, wherein a width of the two first grooves is 0.5 mm to 11.3 mm.

6. The method according to claim 1, wherein a width of the second groove is 0.5 mm to 15 mm.

7. The method according to claim 1, wherein when the shortest distance between the second groove of one of the pair of cutting rollers and the plurality of blades of the other cutting roller, which face the second groove, is defined as $D_2$, $D_2$ is 3.0 mm or more.

8. The method according to claim 1, wherein the cross-sectional area of the noodle strands passing through unit spaces each formed by the annular groove of one of the pair of cutting rollers and the blade of the other cutting roller is 90% or less of the cross-sectional area of the unit space.

9. The method according to claim 1, wherein the noodle strands are used for noodles selected from the group consisting of Chinese noodles, pasta, udon, and soba.

* * * * *